(12) United States Patent
Imes et al.

(10) Patent No.: US 9,716,530 B2
(45) Date of Patent: Jul. 25, 2017

(54) HOME AUTOMATION USING NEAR FIELD COMMUNICATION

(71) Applicant: SAMSUNG ELECTRONICS CO., LTD., Suwon-si, Gyeonggi-do (KR)

(72) Inventors: Kevin R. Imes, Austin, TX (US); James Hollister, Round Rock, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/149,553

(22) Filed: Jan. 7, 2014

(65) Prior Publication Data
US 2014/0191848 A1 Jul. 10, 2014

Related U.S. Application Data

(60) Provisional application No. 61/749,742, filed on Jan. 7, 2013.

(51) Int. Cl.
*H04B 5/00* (2006.01)
*H04L 12/28* (2006.01)
*H04W 4/00* (2009.01)

(52) U.S. Cl.
CPC ......... *H04B 5/0031* (2013.01); *H04B 5/0037* (2013.01); *H04B 5/0062* (2013.01);
(Continued)

(58) Field of Classification Search
CPC ...... H04W 4/003–4/008; F24F 11/0012; F24F 2011/0058–2011/0073; H04B 5/0031–5/0075; H04L 12/282
See application file for complete search history.

(56) References Cited

U.S. PATENT DOCUMENTS 1,568,584 A    1/1926   Blankenship
2,042,633 A    6/1936   Richardson
            (Continued)

FOREIGN PATENT DOCUMENTS

EP     1814260 A2    8/2007
JP     H0879840 A    3/1996
            (Continued)

OTHER PUBLICATIONS

Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.
(Continued)

*Primary Examiner* — Orlando Bousono
(74) *Attorney, Agent, or Firm* — Staas & Halsey LLP

(57) ABSTRACT

A system includes a network device that is disposed at a site and configured to communicate with a wireless network. A controller is disposed at the site and is in communication with the wireless network, and a passive device is disposed at the site and includes a unique identifier disposed thereon. The system further includes a mobile device associated with the site and which includes a communication chip. The communication chip is configured to read the unique identifier when the mobile device is placed in close proximity to the passive device, and a mobile application disposed on the mobile device is configured to transmit the unique identifier to the controller for use in controlling the network device.

20 Claims, 4 Drawing Sheets

(52) U.S. Cl.
CPC ........... *H04L 12/282* (2013.01); *H04W 4/003* (2013.01); *H04W 4/006* (2013.01); *H04W 4/008* (2013.01); *H04B 5/0075* (2013.01); *H04L 2012/2841* (2013.01)

(56) References Cited

U.S. PATENT DOCUMENTS

| | | | |
|---|---|---|---|
| 2,427,965 | A | 9/1947 | Henderson |
| 2,931,006 | A | 3/1960 | Klumpp, Jr. |
| 2,960,677 | A | 11/1960 | Stearn et al. |
| 3,194,957 | A | 7/1965 | Caldwell et al. |
| 3,237,148 | A | 2/1966 | Ege |
| 3,531,759 | A | 9/1970 | Hansen |
| 3,675,183 | A | 7/1972 | Drake |
| 3,808,602 | A | 4/1974 | Foster et al. |
| 4,407,447 | A | 10/1983 | Sayegh |
| 4,437,716 | A | 3/1984 | Cooper |
| 4,497,031 | A | 1/1985 | Froehling et al. |
| 4,645,286 | A | 2/1987 | Isban et al. |
| 5,127,575 | A | 7/1992 | Beerbaum |
| 5,274,571 | A | 12/1993 | Hesse et al. |
| 5,289,362 | A | 2/1994 | Liebl et al. |
| 5,461,390 | A | 10/1995 | Hoshen |
| 5,476,221 | A | 12/1995 | Seymour |
| 5,537,339 | A | 7/1996 | Naganuma et al. |
| 5,544,036 | A | 8/1996 | Brown, Jr. et al. |
| 5,566,084 | A | 10/1996 | Cmar |
| 5,595,342 | A | 1/1997 | McNair et al. |
| 5,682,949 | A | 11/1997 | Ratcliffe et al. |
| 5,725,148 | A | 3/1998 | Hartman |
| 5,729,442 | A | 3/1998 | Frantz |
| 5,764,146 | A | 6/1998 | Baldwin et al. |
| 5,812,949 | A | 9/1998 | Taketsugu |
| 5,819,840 | A | 10/1998 | Wilson et al. |
| 5,884,072 | A | 3/1999 | Rasmussen |
| 5,964,625 | A | 10/1999 | Farley |
| 5,987,379 | A | 11/1999 | Smith |
| 6,014,080 | A | 1/2000 | Layson, Jr. |
| 6,073,019 | A | 6/2000 | Lowdon |
| 6,108,614 | A | 8/2000 | Lincoln et al. |
| 6,128,661 | A | 10/2000 | Flanagin et al. |
| 6,175,078 | B1 | 1/2001 | Bambardekar et al. |
| 6,353,180 | B1 | 3/2002 | DeBartolo, Jr. et al. |
| 6,400,956 | B1 | 6/2002 | Richton |
| 6,442,639 | B1 | 8/2002 | McElhattan et al. |
| 6,478,233 | B1 | 11/2002 | Shah |
| 6,483,028 | B2 | 11/2002 | DeBartolo, Jr. et al. |
| 6,553,418 | B1 | 4/2003 | Collins et al. |
| 6,623,311 | B1 | 9/2003 | Dehan |
| 6,636,893 | B1 | 10/2003 | Fong |
| 6,684,087 | B1 | 1/2004 | Yu et al. |
| 6,785,542 | B1 | 8/2004 | Blight et al. |
| 6,785,630 | B2 | 8/2004 | Kolk et al. |
| 6,850,252 | B1 | 2/2005 | Hoffberg |
| 6,868,293 | B1 | 3/2005 | Schurr et al. |
| 6,975,958 | B2 | 12/2005 | Bohrer et al. |
| 6,976,366 | B2 | 12/2005 | Starling et al. |
| 6,980,659 | B1 | 12/2005 | Elliott |
| 6,999,757 | B2 | 2/2006 | Bates et al. |
| 7,016,751 | B2 | 3/2006 | Nordquist et al. |
| 7,031,945 | B1 | 4/2006 | Donner |
| 7,082,460 | B2 | 7/2006 | Hansen et al. |
| 7,083,109 | B2 | 8/2006 | Pouchak |
| 7,099,483 | B2 | 8/2006 | Inagaki |
| 7,114,554 | B2 | 10/2006 | Bergman et al. |
| 7,127,328 | B2 | 10/2006 | Ransom |
| 7,127,734 | B1 | 10/2006 | Amit |
| 7,130,719 | B2 | 10/2006 | Ehlers et al. |
| 7,139,564 | B2 | 11/2006 | Hebert |
| 7,140,551 | B2 | 11/2006 | De Pauw et al. |
| 7,155,305 | B2 | 12/2006 | Hayes et al. |
| 7,159,789 | B2 | 1/2007 | Schwendinger et al. |
| 7,188,003 | B2 | 3/2007 | Ransom et al. |
| 7,197,011 | B2 | 3/2007 | Fong |
| 7,216,021 | B2 | 5/2007 | Matsubara et al. |
| 7,222,800 | B2 | 5/2007 | Wruck |
| 7,224,966 | B2 | 5/2007 | Caspi et al. |
| 7,252,230 | B1 * | 8/2007 | Sheikh ................ G06Q 10/087 235/384 |
| 7,257,397 | B2 | 8/2007 | Shamoon et al. |
| 7,343,226 | B2 | 3/2008 | Ehlers et al. |
| 7,349,761 | B1 | 3/2008 | Cruse |
| 7,363,053 | B2 | 4/2008 | Dalton et al. |
| 7,403,838 | B2 | 7/2008 | Deen et al. |
| 7,444,401 | B1 | 10/2008 | Keyghobad et al. |
| 7,451,017 | B2 | 11/2008 | McNally |
| 7,460,827 | B2 | 12/2008 | Schuster et al. |
| 7,477,617 | B2 | 1/2009 | Chen et al. |
| 7,510,126 | B2 | 3/2009 | Rossi et al. |
| 7,525,425 | B2 | 4/2009 | Diem |
| 7,526,539 | B1 | 4/2009 | Hsu |
| 7,554,437 | B2 | 6/2009 | Axelsen |
| 7,565,225 | B2 | 7/2009 | Dushane |
| 7,567,844 | B2 | 7/2009 | Thomas et al. |
| 7,574,208 | B2 | 8/2009 | Hanson et al. |
| 7,574,283 | B2 | 8/2009 | Wang et al. |
| 7,590,703 | B2 | 9/2009 | Cashman et al. |
| 7,644,591 | B2 | 1/2010 | Singh et al. |
| 7,665,670 | B2 | 2/2010 | Ahmed |
| 7,668,532 | B2 | 2/2010 | Shamoon et al. |
| 7,671,544 | B2 | 3/2010 | Clark et al. |
| 7,693,581 | B2 | 4/2010 | Callaghan et al. |
| 7,706,928 | B1 | 4/2010 | Howell et al. |
| 7,715,951 | B2 | 5/2010 | Forbes et al. |
| 7,747,739 | B2 | 6/2010 | Bridges et al. |
| 7,752,309 | B2 | 7/2010 | Keyghobad et al. |
| 7,761,910 | B2 | 7/2010 | Ransom |
| 7,775,453 | B2 | 8/2010 | Hara |
| 7,783,738 | B2 | 8/2010 | Keyghobad et al. |
| 7,792,946 | B2 | 9/2010 | Keyghobad et al. |
| 7,798,417 | B2 | 9/2010 | Snyder et al. |
| 7,812,766 | B2 | 10/2010 | Leblanc et al. |
| 7,813,831 | B2 | 10/2010 | McCoy et al. |
| 7,865,252 | B2 | 1/2011 | Clayton |
| 7,881,816 | B2 | 2/2011 | Mathiesen et al. |
| 7,884,727 | B2 | 2/2011 | Tran |
| 7,886,166 | B2 | 2/2011 | Schnekendorf et al. |
| 7,895,257 | B2 | 2/2011 | Helal et al. |
| 7,908,019 | B2 | 3/2011 | Ebrom et al. |
| 7,908,116 | B2 | 3/2011 | Steinberg et al. |
| 7,908,117 | B2 | 3/2011 | Steinberg et al. |
| 7,912,559 | B2 | 3/2011 | McCoy et al. |
| 7,917,914 | B2 | 3/2011 | McCoy et al. |
| 7,918,406 | B2 | 4/2011 | Rosen |
| 7,921,429 | B2 | 4/2011 | McCoy et al. |
| 7,941,530 | B2 | 5/2011 | Ha et al. |
| 7,949,615 | B2 | 5/2011 | Ehlers et al. |
| 7,953,518 | B2 | 5/2011 | Kansal et al. |
| 7,973,707 | B2 | 7/2011 | Verechtchiagine |
| 7,975,051 | B2 | 7/2011 | Saint Clair et al. |
| 7,979,163 | B2 | 7/2011 | Terlson et al. |
| 8,005,780 | B2 | 8/2011 | McCoy et al. |
| 8,010,237 | B2 | 8/2011 | Cheung et al. |
| 8,010,418 | B1 | 8/2011 | Lee |
| 8,010,812 | B2 | 8/2011 | Forbes, Jr. et al. |
| 8,019,445 | B2 | 9/2011 | Marhoefer |
| 8,024,073 | B2 | 9/2011 | Imes et al. |
| 8,028,049 | B1 | 9/2011 | Ellis et al. |
| 8,028,302 | B2 | 9/2011 | Glotzbach et al. |
| 8,032,233 | B2 | 10/2011 | Forbes, Jr. et al. |
| 8,042,048 | B2 | 10/2011 | Wilson et al. |
| 8,049,592 | B2 | 11/2011 | Wang et al. |
| 8,063,775 | B2 | 11/2011 | Reed et al. |
| 8,082,065 | B2 | 12/2011 | Imes et al. |
| 8,090,477 | B1 | 1/2012 | Steinberg |
| 8,091,765 | B2 | 1/2012 | Jiang et al. |
| 8,091,795 | B1 | 1/2012 | McLellan et al. |
| 8,099,195 | B2 | 1/2012 | Imes et al. |
| 8,099,198 | B2 | 1/2012 | Gurin |
| 8,108,076 | B2 | 1/2012 | Imes et al. |
| 8,117,299 | B2 | 2/2012 | Narayanaswami et al. |
| 8,126,685 | B2 | 2/2012 | Nasle |
| 8,131,401 | B2 | 3/2012 | Nasle |
| 8,140,279 | B2 | 3/2012 | Subbloie |

(56) References Cited

U.S. PATENT DOCUMENTS

| | | |
|---|---|---|
| 8,140,667 B2 | 3/2012 | Keyghobad et al. |
| 8,176,112 B2 | 5/2012 | Hicks, IIII et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,355,865 B2 | 1/2013 | Wagner et al. |
| 8,406,783 B2 | 3/2013 | Eitan et al. |
| 8,406,933 B2 | 3/2013 | Nagel et al. |
| 8,461,725 B1 * | 6/2013 | Stubbs ............ H01H 9/54 307/140 |
| 8,498,572 B1 * | 7/2013 | Schooley ......... H04B 5/0031 340/10.51 |
| 9,080,782 B1 * | 7/2015 | Sheikh ............ F24F 11/00 |
| 2002/0073217 A1 | 6/2002 | Ma et al. |
| 2002/0147006 A1 | 10/2002 | Coon et al. |
| 2002/0194500 A1 | 12/2002 | Bajikar |
| 2002/0196151 A1 | 12/2002 | Troxler |
| 2002/0198984 A1 | 12/2002 | Goldstein et al. |
| 2003/0120817 A1 | 6/2003 | Ott et al. |
| 2003/0122684 A1 | 7/2003 | Porter et al. |
| 2003/0149734 A1 | 8/2003 | Aaltonen et al. |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2004/0212493 A1 * | 10/2004 | Stilp ............ G06K 7/0008 340/531 |
| 2004/0212500 A1 * | 10/2004 | Stilp ............ G08B 19/005 340/541 |
| 2005/0038326 A1 | 2/2005 | Mathur |
| 2005/0040247 A1 | 2/2005 | Pouchak |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0172056 A1 | 8/2005 | Ahn |
| 2005/0194457 A1 | 9/2005 | Dolan |
| 2005/0242945 A1 | 11/2005 | Perkinson |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0161635 A1 | 7/2006 | Lamkin et al. |
| 2006/0179079 A1 | 8/2006 | Kolehmainen |
| 2006/0190538 A1 * | 8/2006 | Hwang ............ H04L 12/2809 709/204 |
| 2006/0205354 A1 * | 9/2006 | Pirzada ........... H04L 63/0492 455/66.1 |
| 2006/0224901 A1 * | 10/2006 | Lowe ............. H04L 63/062 713/186 |
| 2006/0253590 A1 * | 11/2006 | Nagy ............. H04L 67/125 709/226 |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2007/0032225 A1 | 2/2007 | Konicek et al. |
| 2007/0037554 A1 | 2/2007 | Freeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman et al. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0190939 A1 * | 8/2007 | Abel ............ H04B 5/0031 455/41.2 |
| 2007/0197236 A1 | 8/2007 | Ahn et al. |
| 2007/0200712 A1 * | 8/2007 | Arneson ......... G06K 7/10316 340/572.8 |
| 2007/0221741 A1 | 9/2007 | Wagner et al. |
| 2007/0240173 A1 | 10/2007 | McCoy et al. |
| 2007/0241203 A1 | 10/2007 | Wagner et al. |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupray |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem et al. |
| 2008/0103610 A1 | 5/2008 | Ebrom et al. |
| 2008/0104208 A1 | 5/2008 | Ebrom et al. |
| 2008/0104212 A1 | 5/2008 | Ebrom et al. |
| 2008/0109830 A1 | 5/2008 | Giotzbach et al. |
| 2008/0127325 A1 | 5/2008 | Ebrom et al. |
| 2008/0137670 A1 | 6/2008 | Ebrom et al. |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0248751 A1 * | 10/2008 | Pirzada ........... H04L 63/0492 455/41.2 |
| 2008/0249642 A1 | 10/2008 | Chen |
| 2008/0262820 A1 | 10/2008 | Nasle |
| 2008/0270562 A1 | 10/2008 | Jin et al. |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda et al. |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. |
| 2009/0065596 A1 | 3/2009 | Seem et al. |
| 2009/0076749 A1 | 3/2009 | Nasle |

(56) References Cited

U.S. PATENT DOCUMENTS

| | | | |
|---|---|---|---|
| 2009/0082015 A1* | 3/2009 | Ravi | H04W 48/04 455/433 |
| 2009/0082888 A1 | 3/2009 | Johansen | |
| 2009/0083167 A1 | 3/2009 | Subbloie | |
| 2009/0093688 A1 | 4/2009 | Mathur | |
| 2009/0098857 A1 | 4/2009 | De Atley | |
| 2009/0098880 A1 | 4/2009 | Lindquist | |
| 2009/0100492 A1 | 4/2009 | Hicks, III et al. | |
| 2009/0103535 A1 | 4/2009 | McCoy et al. | |
| 2009/0112522 A1 | 4/2009 | Rasmussen | |
| 2009/0113037 A1 | 4/2009 | Pouchak | |
| 2009/0129301 A1 | 5/2009 | Belimpasakis | |
| 2009/0132070 A1 | 5/2009 | Ebrom et al. | |
| 2009/0135836 A1 | 5/2009 | Veillette | |
| 2009/0138099 A1 | 5/2009 | Veillette | |
| 2009/0157529 A1 | 6/2009 | Ehlers et al. | |
| 2009/0160626 A1 | 6/2009 | Jeon et al. | |
| 2009/0164049 A1 | 6/2009 | Nibler et al. | |
| 2009/0170431 A1* | 7/2009 | Pering | H04B 5/02 455/41.1 |
| 2009/0170483 A1* | 7/2009 | Barnett | G06Q 20/32 455/414.2 |
| 2009/0187499 A1 | 7/2009 | Mulder et al. | |
| 2009/0193217 A1 | 7/2009 | Korecki et al. | |
| 2009/0195349 A1 | 8/2009 | Frader-Thompson et al. | |
| 2009/0204837 A1 | 8/2009 | Raval et al. | |
| 2009/0240381 A1 | 9/2009 | Lane | |
| 2009/0248702 A1 | 10/2009 | Schwartz et al. | |
| 2009/0267787 A1 | 10/2009 | Pryor et al. | |
| 2009/0270138 A1 | 10/2009 | Raveendran | |
| 2009/0302994 A1 | 12/2009 | Rhee et al. | |
| 2009/0305644 A1 | 12/2009 | Rhee et al. | |
| 2009/0312968 A1 | 12/2009 | Phillips | |
| 2009/0313689 A1* | 12/2009 | Nystrom | H04L 67/125 726/9 |
| 2009/0316671 A1 | 12/2009 | Rolf et al. | |
| 2010/0017126 A1 | 1/2010 | Holcman et al. | |
| 2010/0034386 A1 | 2/2010 | Choong et al. | |
| 2010/0035587 A1 | 2/2010 | Bennett | |
| 2010/0035613 A1 | 2/2010 | Schroter | |
| 2010/0063867 A1 | 3/2010 | Proctor, Jr. et al. | |
| 2010/0066507 A1 | 3/2010 | Myllymaeki | |
| 2010/0069035 A1 | 3/2010 | Johnson | |
| 2010/0069087 A1 | 3/2010 | Chow et al. | |
| 2010/0070100 A1 | 3/2010 | Finlinson et al. | |
| 2010/0070101 A1 | 3/2010 | Benes et al. | |
| 2010/0075656 A1 | 3/2010 | Howarter et al. | |
| 2010/0077466 A1* | 3/2010 | Lowe | H04L 63/062 726/6 |
| 2010/0081375 A1 | 4/2010 | Rosenblatt et al. | |
| 2010/0081468 A1 | 4/2010 | Brothers | |
| 2010/0082174 A1 | 4/2010 | Weaver | |
| 2010/0082176 A1 | 4/2010 | Chang | |
| 2010/0082431 A1 | 4/2010 | Ramer et al. | |
| 2010/0087932 A1 | 4/2010 | McCoy et al. | |
| 2010/0088261 A1 | 4/2010 | Montalvo | |
| 2010/0094475 A1 | 4/2010 | Masters et al. | |
| 2010/0094737 A1 | 4/2010 | Lambird | |
| 2010/0099410 A1 | 4/2010 | Sweeney et al. | |
| 2010/0100253 A1 | 4/2010 | Fausak et al. | |
| 2010/0113061 A1 | 5/2010 | Holcman | |
| 2010/0115314 A1 | 5/2010 | Sultenfuss | |
| 2010/0121499 A1 | 5/2010 | Besore et al. | |
| 2010/0123414 A1 | 5/2010 | Antonopoulos | |
| 2010/0127854 A1 | 5/2010 | Helvick et al. | |
| 2010/0127889 A1 | 5/2010 | Vogel et al. | |
| 2010/0130178 A1 | 5/2010 | Bennett et al. | |
| 2010/0130213 A1 | 5/2010 | Vendrow et al. | |
| 2010/0138764 A1 | 6/2010 | Hatambeiki et al. | |
| 2010/0141437 A1 | 6/2010 | Karam et al. | |
| 2010/0145534 A1 | 6/2010 | Forbes, Jr. et al. | |
| 2010/0152997 A1 | 6/2010 | De Silva et al. | |
| 2010/0156665 A1 | 6/2010 | Krzyzanowski et al. | |
| 2010/0159936 A1 | 6/2010 | Brisebois et al. | |
| 2010/0161148 A1 | 6/2010 | Forbes, Jr. et al. | |
| 2010/0161149 A1 | 6/2010 | Nguyen et al. | |
| 2010/0164713 A1 | 7/2010 | Wedig et al. | |
| 2010/0165861 A1 | 7/2010 | Rrdland et al. | |
| 2010/0169030 A1 | 7/2010 | Parlos et al. | |
| 2010/0174643 A1 | 7/2010 | Schaefer et al. | |
| 2010/0179670 A1 | 7/2010 | Forbes, Jr. et al. | |
| 2010/0179672 A1 | 7/2010 | Beckmann et al. | |
| 2010/0179708 A1 | 7/2010 | Watson et al. | |
| 2010/0187219 A1 | 7/2010 | Besore et al. | |
| 2010/0188239 A1 | 7/2010 | Rockwell | |
| 2010/0188279 A1 | 7/2010 | Shamilian et al. | |
| 2010/0191352 A1 | 7/2010 | Quail | |
| 2010/0193592 A1 | 8/2010 | Simon et al. | |
| 2010/0198713 A1 | 8/2010 | Forbes, Jr. et al. | |
| 2010/0207728 A1 | 8/2010 | Roscoe et al. | |
| 2010/0217450 A1 | 8/2010 | Beal et al. | |
| 2010/0217451 A1 | 8/2010 | Kouda et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0217837 A1 | 8/2010 | Ansari et al. | |
| 2010/0218108 A1 | 8/2010 | Crabtree et al. | |
| 2010/0222935 A1 | 9/2010 | Forbes, Jr. et al. | |
| 2010/0228854 A1 | 9/2010 | Morrison et al. | |
| 2010/0235008 A1 | 9/2010 | Forbes, Jr. et al. | |
| 2010/0241275 A1 | 9/2010 | Crawford et al. | |
| 2010/0249955 A1 | 9/2010 | Sitton | |
| 2010/0250590 A1 | 9/2010 | Galvin | |
| 2010/0256823 A1 | 10/2010 | Cherukuri et al. | |
| 2010/0257539 A1 | 10/2010 | Narayanan et al. | |
| 2010/0261465 A1 | 10/2010 | Rhoads et al. | |
| 2010/0262298 A1 | 10/2010 | Johnson et al. | |
| 2010/0262299 A1 | 10/2010 | Cheung et al. | |
| 2010/0262336 A1 | 10/2010 | Rivas et al. | |
| 2010/0272192 A1 | 10/2010 | Varadarajan et al. | |
| 2010/0289643 A1 | 11/2010 | Trundle et al. | |
| 2010/0299265 A1 | 11/2010 | Walters et al. | |
| 2010/0299517 A1 | 11/2010 | Jukic et al. | |
| 2010/0305773 A1 | 12/2010 | Cohen | |
| 2010/0315235 A1 | 12/2010 | Adegoke et al. | |
| 2010/0315438 A1 | 12/2010 | Horodezky et al. | |
| 2010/0317332 A1 | 12/2010 | Bathiche et al. | |
| 2010/0317371 A1 | 12/2010 | Westerinen et al. | |
| 2010/0318198 A1 | 12/2010 | Smith et al. | |
| 2010/0324956 A1 | 12/2010 | Lopez et al. | |
| 2010/0324962 A1 | 12/2010 | Nesler et al. | |
| 2010/0332373 A1 | 12/2010 | Crabtree et al. | |
| 2011/0004350 A1 | 1/2011 | Cheifetz et al. | |
| 2011/0004355 A1 | 1/2011 | Wang et al. | |
| 2011/0004513 A1 | 1/2011 | Hoffberg | |
| 2011/0015797 A1 | 1/2011 | Gilstrap | |
| 2011/0015802 A1 | 1/2011 | Imes | |
| 2011/0016023 A1 | 1/2011 | Zakas | |
| 2011/0022239 A1 | 1/2011 | Forbes, Jr. et al. | |
| 2011/0022242 A1 | 1/2011 | Bukhin et al. | |
| 2011/0029655 A1 | 2/2011 | Forbes, Jr. et al. | |
| 2011/0039518 A1 | 2/2011 | Maria | |
| 2011/0040666 A1 | 2/2011 | Crabtree et al. | |
| 2011/0046792 A1 | 2/2011 | Imes et al. | |
| 2011/0046798 A1 | 2/2011 | Imes et al. | |
| 2011/0046799 A1 | 2/2011 | Imes et al. | |
| 2011/0046800 A1 | 2/2011 | Imes et al. | |
| 2011/0046801 A1 | 2/2011 | Imes et al. | |
| 2011/0047482 A1 | 2/2011 | Arthurs et al. | |
| 2011/0051823 A1 | 3/2011 | Imes et al. | |
| 2011/0054699 A1 | 3/2011 | Imes et al. | |
| 2011/0054710 A1 | 3/2011 | Imes et al. | |
| 2011/0061014 A1 | 3/2011 | Frader-Thompson et al. | |
| 2011/0063126 A1 | 3/2011 | Kennedy et al. | |
| 2011/0063999 A1 | 3/2011 | Erdmann et al. | |
| 2011/0069719 A1 | 3/2011 | Fries, IV et al. | |
| 2011/0077789 A1 | 3/2011 | Sun | |
| 2011/0098869 A1 | 4/2011 | Seo et al. | |
| 2011/0106326 A1 | 5/2011 | Anunobi et al. | |
| 2011/0106327 A1 | 5/2011 | Zhou et al. | |
| 2011/0106681 A1 | 5/2011 | Cockerell et al. | |

(56) References Cited

U.S. PATENT DOCUMENTS

| | | | |
|---|---|---|---|
| 2011/0113090 A1 | 5/2011 | Peeri | |
| 2011/0115875 A1 | 5/2011 | Sadwick et al. | |
| 2011/0117878 A1 | 5/2011 | Barash et al. | |
| 2011/0117927 A1 | 5/2011 | Doyle | |
| 2011/0138024 A1 | 6/2011 | Chen et al. | |
| 2011/0148626 A1 | 6/2011 | Acevedo | |
| 2011/0153525 A1 | 6/2011 | Benco et al. | |
| 2011/0160881 A1 | 6/2011 | Grey | |
| 2011/0172837 A1 | 7/2011 | Forbes, Jr. | |
| 2011/0173542 A1 | 7/2011 | Imes et al. | |
| 2011/0202185 A1 | 8/2011 | Imes et al. | |
| 2011/0202195 A1 | 8/2011 | Finch et al. | |
| 2011/0202293 A1 | 8/2011 | Kobraei et al. | |
| 2011/0211584 A1 | 9/2011 | Mahmoud | |
| 2011/0214060 A1 | 9/2011 | Imes et al. | |
| 2011/0224838 A1 | 9/2011 | Imes et al. | |
| 2011/0227704 A1 | 9/2011 | Padmanabhan et al. | |
| 2011/0231020 A1 | 9/2011 | Ramachandran et al. | |
| 2011/0237185 A1* | 9/2011 | Murray | G01S 5/02 455/41.1 |
| 2011/0246606 A1 | 10/2011 | Barbeau et al. | |
| 2011/0246898 A1 | 10/2011 | Imes et al. | |
| 2011/0251725 A1 | 10/2011 | Chan | |
| 2011/0257809 A1 | 10/2011 | Forbes, Jr. et al. | |
| 2011/0258022 A1 | 10/2011 | Forbes, Jr. et al. | |
| 2011/0264290 A1 | 10/2011 | Drew | |
| 2011/0264296 A1 | 10/2011 | Drake et al. | |
| 2011/0282497 A1 | 11/2011 | Josephson et al. | |
| 2011/0295393 A1 | 12/2011 | Lindahl | |
| 2011/0296169 A1 | 12/2011 | Palmer | |
| 2011/0302431 A1 | 12/2011 | Diab et al. | |
| 2011/0307101 A1 | 12/2011 | Imes et al. | |
| 2011/0316664 A1 | 12/2011 | Olcott et al. | |
| 2012/0022709 A1 | 1/2012 | Taylor | |
| 2012/0061480 A1 | 3/2012 | Deligiannis et al. | |
| 2012/0106672 A1* | 5/2012 | Shelton | B60L 3/0069 375/295 |
| 2012/0126020 A1 | 5/2012 | Filson et al. | |
| 2012/0157058 A1* | 6/2012 | Lowe | H04L 63/062 455/411 |
| 2012/0169249 A1 | 7/2012 | Loveland et al. | |
| 2012/0179547 A1 | 7/2012 | Besore et al. | |
| 2012/0189140 A1 | 7/2012 | Hughes et al. | |
| 2012/0244805 A1* | 9/2012 | Haikonen | H04W 52/0274 455/41.2 |
| 2012/0312874 A1 | 12/2012 | Jonsson | |
| 2012/0315848 A1* | 12/2012 | Smith | H04B 5/02 455/41.1 |
| 2013/0052946 A1* | 2/2013 | Chatterjee | H04W 4/008 455/41.1 |
| 2013/0076491 A1* | 3/2013 | Brandsma | H04W 52/0229 340/10.3 |
| 2013/0083805 A1* | 4/2013 | Lu | G06F 1/3212 370/401 |
| 2013/0085620 A1* | 4/2013 | Lu | G06F 1/3212 700/286 |
| 2013/0086245 A1* | 4/2013 | Lu | G06F 1/3212 709/223 |
| 2013/0086375 A1* | 4/2013 | Lyne | H04L 9/00 713/153 |
| 2013/0087629 A1 | 4/2013 | Stefanski et al. | |
| 2013/0092741 A1* | 4/2013 | Loh | G06Q 20/32 235/492 |
| 2013/0099010 A1 | 4/2013 | Filson et al. | |
| 2013/0109404 A1* | 5/2013 | Husney | H04W 4/02 455/456.1 |
| 2013/0181819 A1* | 7/2013 | McLaren | H04W 4/008 340/10.4 |
| 2013/0238140 A1* | 9/2013 | Malchiondo | H04L 12/2807 700/276 |
| 2014/0006131 A1* | 1/2014 | Causey | G06Q 10/0875 705/14.24 |
| 2014/0181521 A1* | 6/2014 | Hemphill | H04L 9/0819 713/171 |

FOREIGN PATENT DOCUMENTS

| | | |
|---|---|---|
| JP | 2006092035 A | 4/2006 |
| WO | 0227639 A1 | 4/2002 |
| WO | 2007109557 A2 | 9/2007 |
| WO | 2008134460 A1 | 11/2008 |
| WO | 2009034720 A1 | 3/2009 |
| WO | 2009036764 A2 | 3/2009 |
| WO | 2009067251 A1 | 5/2009 |
| WO | 2009097400 A1 | 8/2009 |

OTHER PUBLICATIONS

BAYweb Thermostat system, Nov. 11, 2009.
Stigge, B. "Informed Home Energy Behavior: Developing a tool for homeowners to monitor, plan and learn about energy conservation," Massachusetts Institute of Technology, 2001.
Inncom e529/X529 thermostat and logic board system, Issued Sep. 12, 2006.
Seligman, C., et al. Behavior Approaches to Residential Energy Conservation. "Saving Energy in the Home." Ballinger Publishing Co., 1978.
Slavin, Alison Jane and Trundle, Stephen Scott, Remote Thermostat Control/Energy Monitoring, U.S. Appl. No. 61/179,224, filed May 18, 2009; 14 pages.
Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.
"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.
Klym et al., The Evolution of RFID Networks: The Potential for Disruptive Innovation, Mar. 2006, MIT Communication Futures Program, pp. 1-20.
Pering et al., Spontaneous Marriages of Mobile Devices and Interactive Space, Communication of the ACM, Sep. 2005, pp. 53-59.
Jaring et al., Improving Mobile Solution Workflows and Usability Using Near Field Communication Technology, 2007, Springer-Verlag Berlin Heidelberg, pp. 358-373.
"Wi-Fi", Wikipedia, printed Jul. 8, 2013.
Inncom International, Inc. "Installation User Manual", Revision 3.1, Sep. 12, 2006, pp. 1-36.
BAYweb Thermostat Owners Manual, Bay Controls, LLC, published Nov. 11, 2009.
Gupta, Manu, Intille, Stephen S. and Larson, Kent, Adding GPS-Control to Traditional Thermostats: AN Exploration of Potential Energy Savings and Design Challenges. House_n. Massachusetts Institute of Technology, Cambridge, MA 02142 USA. 2009, Springer-Verlag Berlin, Heideberg.
Mozer, M., et al. The Neurothermostat: Predictive Optimal Control of Residential Heating Systems. "Advances in Neural Information Processing Systems 9." MIT Press, 1997.
"Request-Response", Wikipedia, Jul. 25, 2013.
e4 Smart Digital Thermostat—E529, Inncom by Honeywell, revised Aug. 2012 (Aug. 2012).

* cited by examiner

HOME AUTOMATION USING NEAR FIELD COMMUNICATION

CROSS-REFERENCE TO RELATED APPLICATIONS

The subject application claims priority to U.S. Provisional Application Ser. No. 61/749,742 entitled "Home Automation Using Near Field Communication", filed on Jan. 7, 2013, which is hereby incorporated by reference herein.

TECHNICAL FIELD

The present disclosure relates to a system and method for providing improved home automation control. More specifically, the present invention relates to a system and method that utilizes near field communication to provide improved home automation control.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Figure 1:
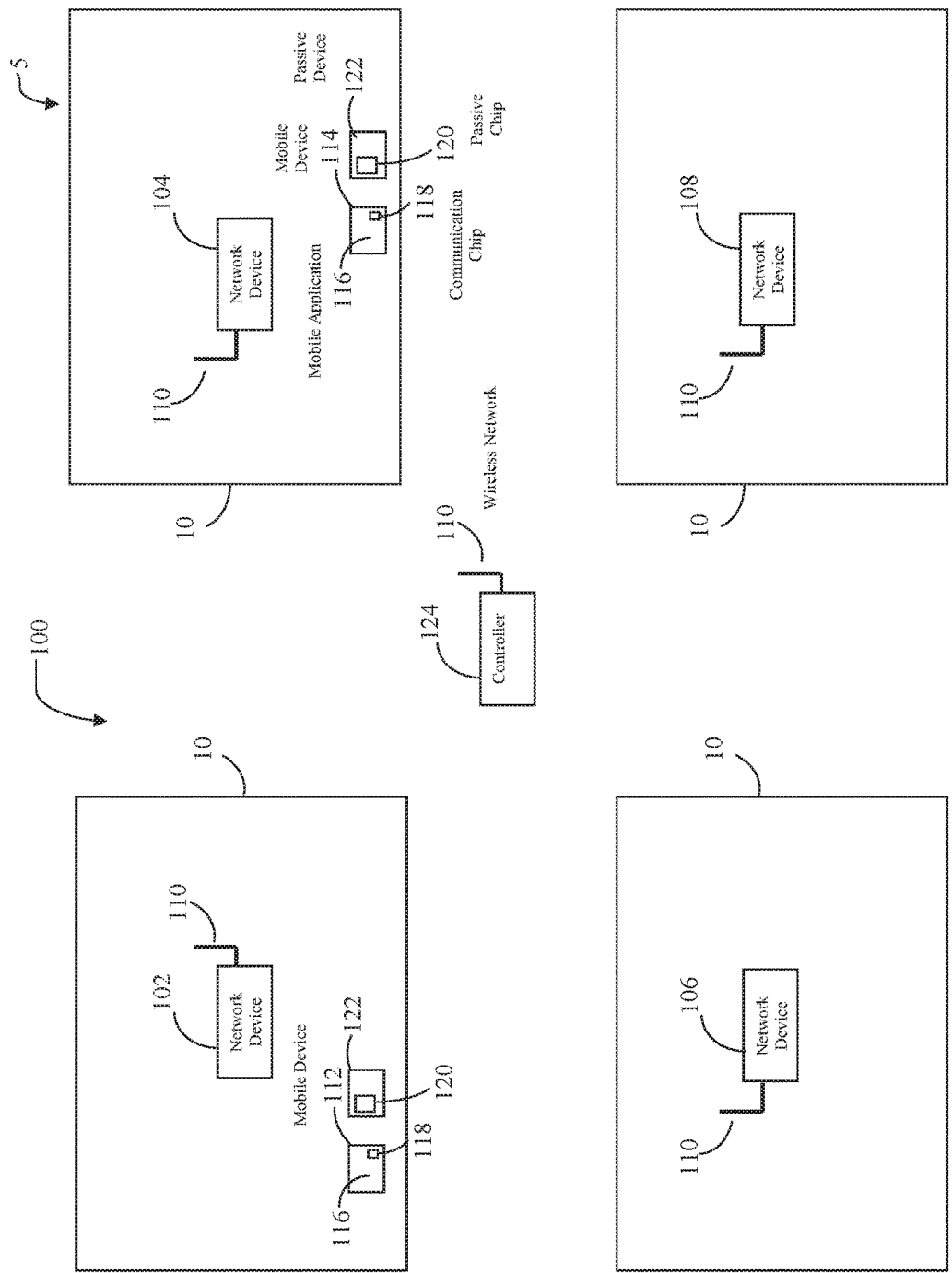
FIG. 1 is a schematic illustration of a home automation control system in accordance with an aspect of the present disclosure.
Figure 2:
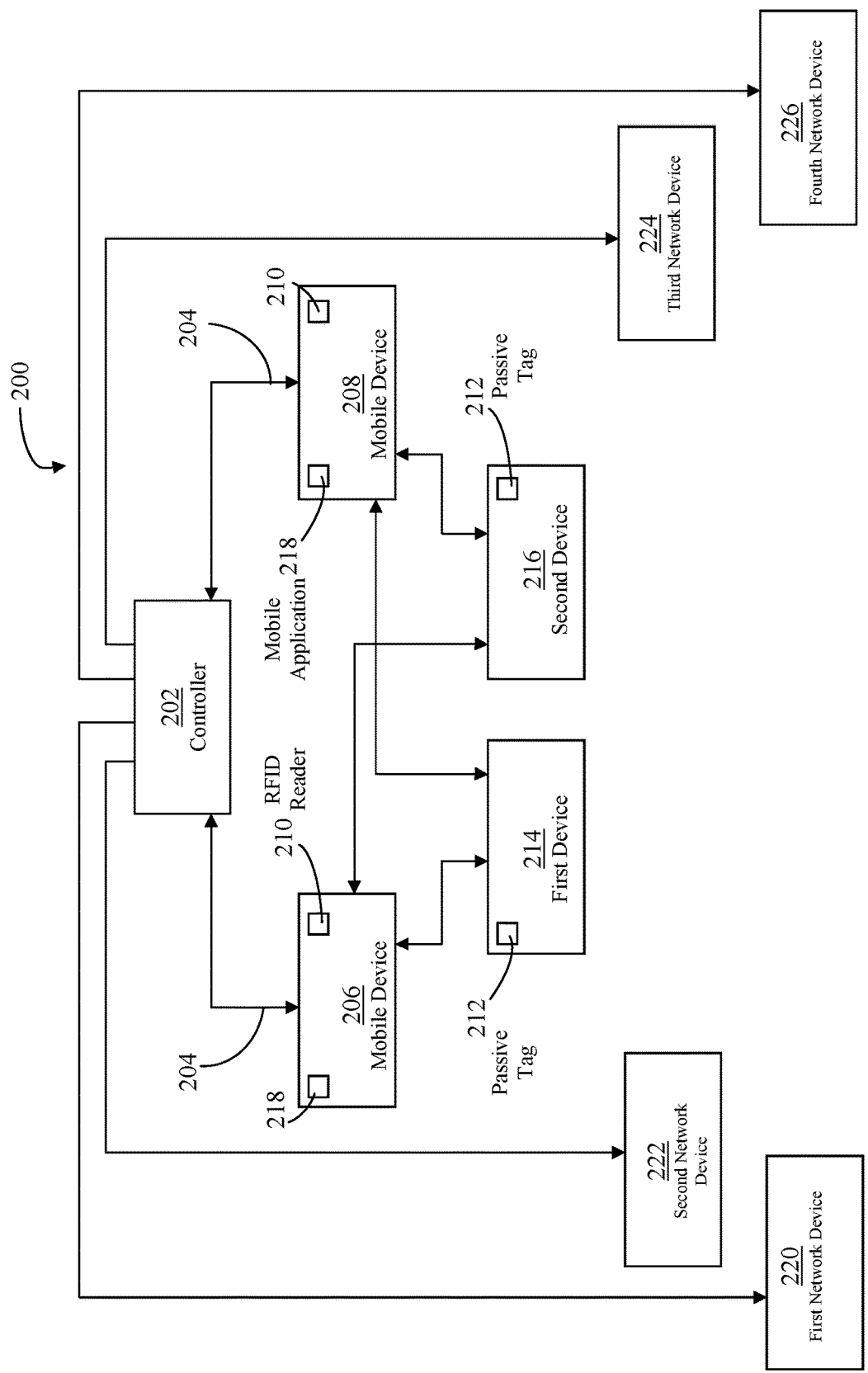
FIG. 2 is a schematic illustration of a home automation control system in accordance with another aspect of the present disclosure.
Figure 3:
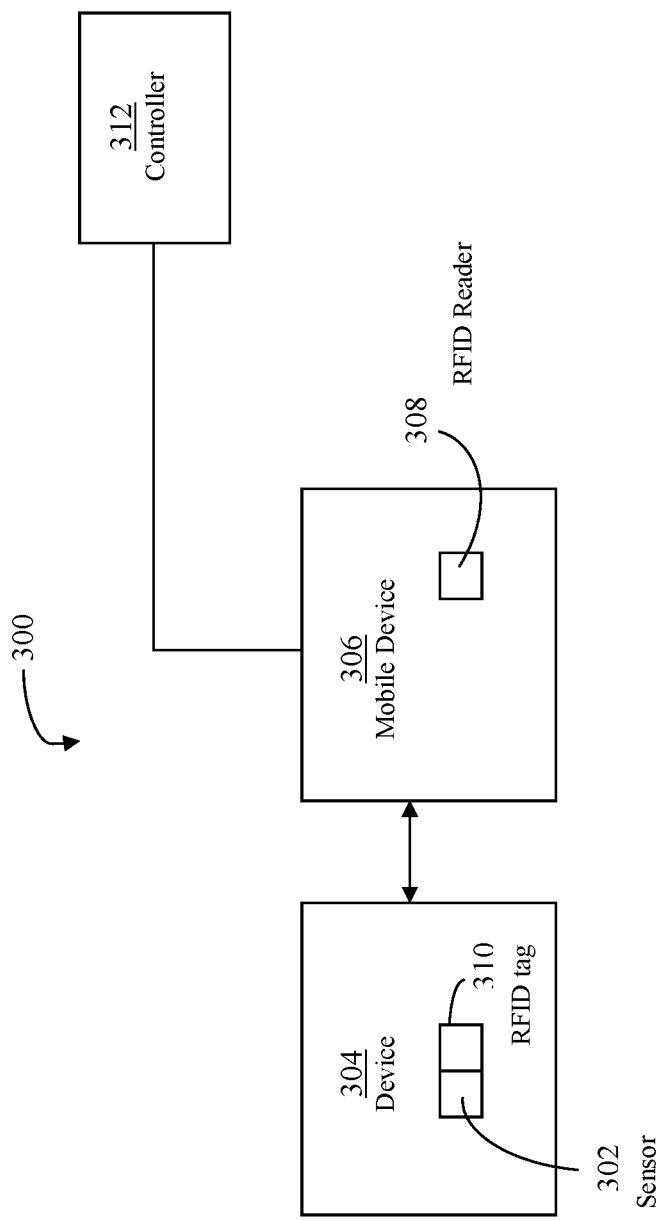
FIG. 3 is a schematic illustration of a home automation control system in accordance with still another aspect of the present disclosure.
Figure 4:
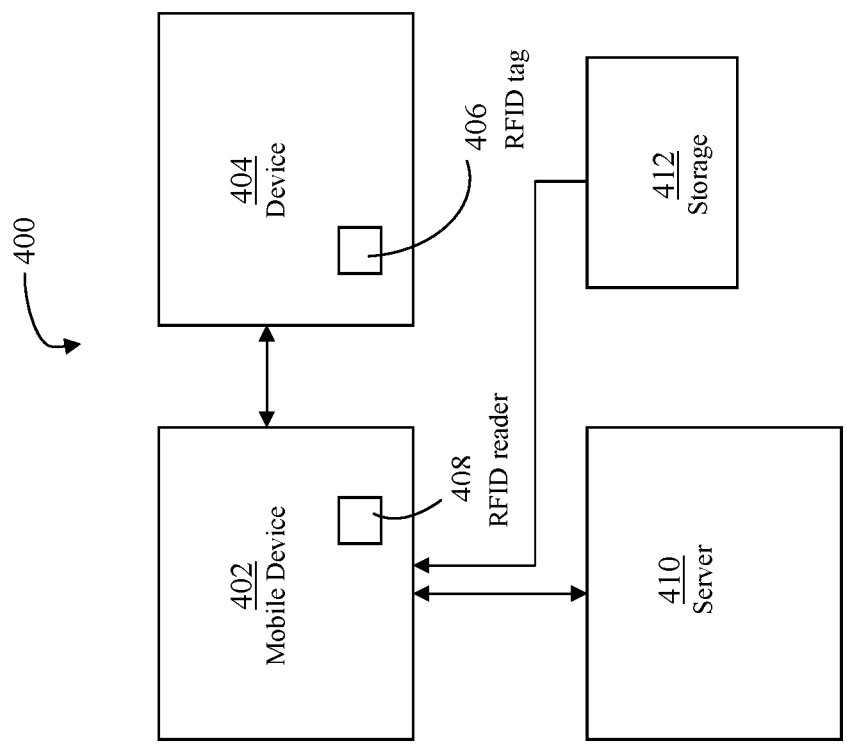
FIG. 4 is a schematic illustration of a home automation control system in accordance with yet another aspect of the present disclosure.

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects disclosed herein provide a home management system and a method of managing a home management system.

Devices or programs that are in communication with one another need not be in continuous communication with each other unless expressly specified otherwise. In addition, devices or programs that are in communication with one another may communicate directly or indirectly through one or more intermediaries.

For purposes of this disclosure, an home management system, a first network device, a second network device or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an home management system, a first network device, a second network device or any combination thereof can include any combination of a personal computer, a PDA, a consumer electronic device, a media device, a smart phone, a cellular or mobile phone, a smart device, a tablet, a television, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system, and can vary in size, shape, performance, functionality, and price.

For purposes of this disclosure, a wireless technology may include but is not limited to, IEEE 802.15-based wireless communication, Zigbee® communication, INSETEON communication, X10 communication protocol, Z-Wave® communication, Bluetooth® communication, Wi-Fi® communication, IEEE 802.11-based communication, WiMAX® communication, IEEE 802.16-based communication, various proprietary wireless communications, or any combination thereof.

According to the present disclosure, a system and method for providing home automation control using near field communication (NFC) is provided. NFC standards cover communication protocols and data exchange formats, and are based on existing radio-frequency identification (RFID) standards, including ISO/IEC 14443 and FeliCa, which are hereby incorporated by reference as though set forth fully herein. The standards include ISO/IEC 18092 and those defined by the NFC Forum, which are hereby incorporated by reference. According to an aspect of the disclosure, the system can be employed at a site that includes a variety of different network devices. The site may be any location, such as residential or commercial site, and the network devices can include any device that operates within the site and can connect to a wireless network or otherwise communicate wirelessly. Exemplary network devices include, but are not limited to, a personal computer, a consumer electronic device, a media device, a watch, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, a wireless router, an automated blind, a tinted window glass system, a television, a coffee maker, and/or a garage door.

With reference to FIG. 1, according to an exemplary aspect, the home automation control system 100 can include a plurality of network devices 102, 104, 106, 108 that may be configured to communicate with a wireless network 110 located at a site 5. Any number of network devices may be employed at the site. According to a further aspect, the system 100 can also include one or more mobile devices 112, 114 that are each identified with the site 5. The mobile devices 112, 114 can be any suitable mobile device that may communicate with the wireless network 110, such as a mobile phone, a tablet, or a laptop computer. Any number of mobile devices can be employed with the system 100. In accordance with this exemplary aspect, each mobile device 112, 114 can include a mobile application 116 disposed thereon to assist in the effectuation of the home automation control system 100. Additionally, each mobile device 112, 114 can include an NFC chip 118 thereon, such as an RFID chip, that has RFID reading capabilities. An exemplary RFID chip that can be employed is a 24 LR series MCU chip available from STMicroelectronics. In accordance with another aspect, the mobile devices 112, 114 could also include a variety of other types of communication chips, including a Z-wave chip, a Zigbee chip, a WiFi chip, a power-line chip or other suitable communication chips depending upon the type of network employed at the site 5.

According to still another aspect, the system 100 can also include a plurality of passive NFC IC chips 120, such as RFID tags, that are disposed in selected locations 10 throughout the site 5. The RFID tags 120 are passive chips that contain a unique identifier that can be programmably mapped to certain information relevant to the operation of the system once the identifier has been read and processed. Pursuant to an aspect, the RFID tags 120 can be associated with various devices 122 within the home, such as a coaster, device charger, or any other suitable structure that may be configured to engage with a mobile device 112, 114. The devices 122 may have the RFID tags 120 embedded therein and may be configured such that the mobile device 112, 114 can be placed in close proximity therewith, such as by resting thereon. By engaging the mobile device 112, 114 with the device 122, the RFID reader 118 on the mobile device 112, 114 is brought into close proximity with the RFID tag 120 in the device 122. When this occurs, the RFID tag 120 is powered up and the unique identifier can be obtained by the RFID reader 118. Alternatively, instead of an RFID tag, a barcode or other suitable passive device may be utilized that contains a unique identifier that can be read and which is mapped to information to be employed in connection with the system. As shown, according to a further aspect, the system 100 may also include a controller 124, which can serve as the hub or brains of the system 100. The controller 124 can also include wireless capabilities such that it is part of the wireless network 110.

According to an aspect of the system 100, a mobile device 112, 114 can be brought into communication with the RFID tag 120 by resting the mobile device 112, 114 on the device 122 such that the RFID reader 118 reads the unique identifier stored on the RFID tag 120. Upon the reading of the RFID tag 120, the mobile application 116 on the mobile device 112, 114 can be triggered. According to an aspect, the mobile device 112, 114 can then communicate with the controller 124 and can transmit the information that was read from the RFID tag 120 to the controller 124 for its use. In accordance with an aspect, the information on each RFID tag 120 may be associated with a specific action related to home automation control. Upon receiving the information on the RFID tag 120, the controller 124 can effectuate the necessary action. It will be appreciated that various RFID tags 120 can be associated with different structures disposed in different locations 10 at the site 5 for communication with the mobile devices 112, 114. Each of the RFID tags 120 can be mapped such that different actions or functions can be effectuated by the controller 124. The information associated with each of the RFID tags 120 can be programmed by a user, for example, through the mobile application, by web based access, or at the controller 124, such as through a touch-screen interface. This allows for customized home automation control through the use of various RFID tags.

In accordance another aspect, the system may be utilized to automate energy management. According to this aspect, a system 200 may be disposed at a residential location, such as at a home. In this exemplary example, the system 200 includes a temperature controller 202, such as a thermostat that can control the operation of an HVAC system at the home. The system 200 may also include a wireless network 204 to which the temperature controller 202 is connected. While a single temperature controller 202 is illustrated, the system 200 may alternatively contain multiple controllers. The system 200 also may include a plurality of mobile devices 206, 208 that are associated with the controller 202 and the system 200. The mobile devices 206, 208 may also be configured to connect to the wireless network 204. According to an aspect, the controller 202 can serve as a gateway which authenticates the mobile devices 206, 208 to permit them access to the system 200. Each mobile device 206, 208 may include a mobile application 218 disposed thereon that allows a user to interact with the controller 202 through interaction with a GUI displayed on the mobile device 206, 208. Pursuant to an aspect, each mobile device 206, 208 can include an RFID reader 210.

Additionally, the system 200 may include a plurality of devices disposed in different locations throughout the home, which each contain a unique passive RFID tag 212 associated therewith. For example, the system 200 can include a first device 214 disposed in a bedroom of the home. According to this example, the system 200 may also include a second device 216 located in a kitchen of the home. According to an aspect, the RFID tags can be embedded in each of the devices 214, 216. As discussed previously, the devices 214, 216 may be any structure configured to communicate with a mobile device 206, 208, such as a pad, a coaster, an inductive charger or the like. Any number of devices with unique RFID tags may be employed in the home. The devices may take on a variety of different shapes, sizes and configurations, and can also be located in any location or room within the home.

According to an aspect, each of the passive RFID tags 212 can contain a unique identifier that the system may map with specific functions or operations. When one of the mobile devices 206, 208 is rested on one of the devices or otherwise brought into communication therewith, the RFID reader 210 on the mobile device 206, 208 can read the unique identifier of the RFID tag 212 and can trigger communication with the temperature controller 202 via the mobile application 218 stored thereon. Based on the unique identifier associated with each RFID tag 212, the temperature controller 202 can take a specific action that is mapped to that unique RFID tag 212.

According to an exemplary aspect, the RFID tag 212 for the first device 214 can be mapped such that when one of the mobile devices 206, 208 is placed thereon or brought into communication therewith, the temperature controller 202 can lower the temperature of the home to a specific set point, such as a night time temperature. Pursuant to another aspect, the RFID tag 212 in the second device 216 can be mapped such that when one of the mobile devices 206, 208 is placed thereon or brought into communication therewith, the temperature controller 202 can raise the temperature of the home to a specific set point, such as if a person has arrived home or gets up in the morning. According to a further aspect, the system can be configured to effectuate action when a mobile device 206, 208 is taken out of communication with an RFID tag.

According to still another aspect, the system 200 can also include a plurality of network devices that are located in the home that can each access the wireless network 204. The controller 202 may regulate the authentication of these devices such that until they are recognized they cannot be joined to the network 204. According to this example, a first network device 220 can be configured as an alarm system. A second network device 222 can be configured as a garage door system. A third network device 224 can be configured as a lighting system. A fourth network device can be configured as a coffee maker system. The system 202 may include more or less network devices and the network devices can be configured as a variety of different apparatus.

According to a further aspect, the various RFID tags can be mapped to effectuate modification of the temperature in the home as well as changes in various operating conditions of one or more of the network devices. According to an example, the RFID tag 212 in the first device 214 can be mapped such that when read by the RFID reader 210 associated with one of the mobile devices 206, 208, the temperature controller 202 not only lowers the temperature set point as discussed above, it can effectuate a change in the operating condition of the first network device 220, the second network device 222 and the third network device 224. For example, the RFID tag 220 in the first device 214 can be mapped such that when one of the mobile devices 206, 208 is brought into close proximity therewith, the alarm system may be turned on, the garage door may be closed, and the lighting system can be turned off.

According to a further example, the RFID tag 212 in the second device 216 can be mapped such that when read by the RFID reader 210 associated with one of the mobile devices 206, 208, the temperature controller 202 not only raises the temperature set point as discussed above, it effectuates a change in the operating condition of the first network device 220, the third network device 224 and the fourth network device 226. For example, the RFID tag 220 in the second device 216 can be mapped such that when one of the mobile devices 206, 208 is brought into close proximity therewith, the alarm system may be turned off, the lighting system may be turned on, and the coffee maker may be turned on. It will be appreciated that each RFID tag can be mapped to effectuate different functions and actions with respect to the temperature controller and the network devices and the described network devices, functions, and combinations are merely exemplary. Obviously, the system may be configured to perform more, less or different functions as desired.

According to still another aspect of the disclosure, the NFC chip (i.e. RFID tag) 300 may also include a temperature sensor 302 associated therewith. According to a further aspect, the sensor 302 can be integrated as part of the NFC chip 300. The NFC chip 300 and the temperature sensor 302 may be incorporated in a device 304 located within the site. As discussed above, the device 304 may be configured to receive a mobile device 306 such that an RFID reader 308 in the mobile device 306 can communicate with the NFC chip 300. According to an aspect, when the mobile device 306 comes into close proximity with the device 304, the RFID reader 308 will read the RFID tag 310 so that the RFID reader 308 can obtain the unique identifier from the RFID tag 310. Concurrently therewith, the ambient temperature reading from the temperature sensor 302 may be transmitted to the RFID reader 308. In accordance with an aspect, the mobile device 306 can transmit the unique identifier and the ambient temperature reading for use by a controller 312 such as a temperature controller. With this information, the controller 312 can automatically adjust the temperature set point in the room where the temperature sensor is located to optimize comfort. In addition to temperature, other information such as time could also be employed to optimize the home automation control system.

Alternatively, the system can include an external temperature sensor that can be used to measure the temperature in the room and communicate that to the NFC chip 300 having a bus or other interface capable of connecting to an external chip. The temperature and identifier could then be communicated to the RFID reader 308 on the mobile device when the mobile device is brought into close proximity to the device having the RFID tag 300. The unique identifier and temperature reading may then be transmitted to the controller 312.

It will be appreciated that the system can be configured to perform a variety of different functions. According to a still a further aspect, the system 400 can be configured such that when a mobile device 402 is brought into proximity with one of the devices 404, the RFID tag 406 is powered up by the RFID reader 408 on the mobile device 402. In accordance with this aspect, the RFID tag 406 contains an identifier that is mapped such that the mobile device 402 through the mobile application disposed thereon will initiate communication with an iCloud server 410 to perform a sync operation such as to upload any new photographs, applications, or the like stored on the mobile devices. Alternatively, the unique identifier on the RFID tag 406 can be mapped such that the mobile application will initiate communication with a local storage 412, such as a memory of a personal computer, to effectuate a sync operation. It will be appreciated that the system can perform a variety of other functions through the utilization of the NFC system.

Note that not all of the activities described above in the general description or the examples are required, that a portion of a specific activity may not be required, and that one or more further activities may be performed in addition to those described. Still further, the sequences in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed:

1. A system comprising:
    a first network device and a second network device disposed at a site and configured to communicate with a wireless network, the first network device configured to perform a first operation of a plurality of operations of the first network device of at least a portion of the site and mapped to the second network device that is configured to perform a second operation of a plurality of operations of the second network device different than the first operation;
    a controller disposed at the site and in communication with the wireless network;
    at least one of a plurality of passive devices disposed at the site and including a unique identifier disposed thereon, the unique identifier associated with at least one of the plurality of operations of the first network device and the second network device;
    the controller configured to communicate with a mobile device associated with the site and including a communication chip disposed thereon, the communication chip configured to read the unique identifier when the mobile device is moved into communication with the at least one of the plurality of passive devices;
    a mobile application disposed on the mobile device and configured to transmit the unique identifier to the controller; and
    the controller further configured to effectuate the first network device to perform the first operation and the second network device to perform the second operation different than the first operation in response to receiving the unique identifier from the mobile application.

2. The system of claim 1, wherein the communication chip is a radio-frequency identification (RFID) reader and the unique identifier is an RFID tag.

3. The system of claim 1, wherein the mobile device comprises at least one of: a mobile phone, a tablet, a watch, and a laptop computer.

4. The system of claim 1, wherein the at least one of the plurality of passive devices comprises at least one of: a coaster, a pad, and an inductive charger.

5. The system of claim 4, wherein the mobile device is further configured to read the unique identifier when the mobile device is placed on the at least one of the plurality of passive devices.

6. The system of claim 1, wherein the unique identifier is programmable through at least one of: the mobile application, the controller, and a web-based server.

7. The system of claim 1, wherein the first network device comprises a thermostat to automatically control the temperature and the unique identifier is associated with a temperature set-point for communication to the controller when the mobile device is disposed in close proximity to the at least one of the plurality of passive devices.

8. The system of claim 1, wherein the second network device comprises an alarm system and the unique identifier is associated with an alarm on or off set-point for communication to the controller when the mobile device is disposed in close proximity to the at least one of the plurality of passive devices.

9. The system of claim 1, wherein the second network device comprises a garage door system and the unique identifier is associated with a garage door open or closed position for communication to the controller when the mobile device is disposed in close proximity to the at least one of the plurality of passive devices.

10. The system of claim 1, wherein the second network device comprises a coffee maker system and the unique identifier is associated with a coffee-maker on set-point for communication to the controller when the mobile device is disposed in close proximity to the at least one of the plurality of passive devices.

11. The system of claim 1, wherein the second network device comprises a lighting system and the unique identifier is associated with a lighting system on or off set-point for communication to the controller when the mobile device is disposed in close proximity to the at least one of the plurality of passive devices.

12. The system of claim 1, wherein the mobile application is further configured to allow a user to interact with the controller using a graphical user interface displayed on the mobile device.

13. The system of claim 1, wherein each of the plurality of passive devices are each disposed in different locations throughout the site.

14. The system of claim 1, wherein the at least one of the plurality of passive devices includes a temperature sensor configured to read an ambient temperature of the site, wherein the communication chip is further configured to read the ambient temperature when the mobile device is disposed in close proximity to the at least one of the plurality of passive devices, and wherein the mobile application is configured to transmit the unique identifier and the read ambient temperature to the controller for use in controlling at least one of the first and second network devices.

15. The system of claim 1, wherein the communication chip is configured to power the at least one of the plurality of passive devices when the mobile device is disposed in closed proximity thereto.

16. The system of claim 1, wherein the mobile device is configured to communicate with a cloud server and the mobile application is configured to synchronize data stored on the mobile device with the cloud server when the mobile device is disposed in close proximity to the at least one of the plurality of passive devices.

17. The system of claim 16, wherein the mobile device is configured to communicate with a memory of a computer for storing the data stored on the mobile device and the mobile application is configured to synchronize the data stored on the mobile device with the memory of the computer when the mobile device is disposed in close proximity to the at least one of the plurality of passive devices.

18. The system of claim 1, wherein the communication chip comprises at least one of: a Z-wave chip, a Zigbee chip, a WiFi chip, and a power-line chip.

19. The system of claim 1, wherein the first network device includes at least one of: an HVAC system, a heat pump, and a thermostat; and wherein the second network device includes at least one of: a personal computer, a consumer electronic device, a media device, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server, an energy substation, a vehicle charging station, a renewable energy production device, a renewable energy control device, an energy storage management system, a smart appliance, a water pump, a hot water heater, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a switch router, a wireless router, an automated blind, a tinted window glass system, a television, a coffee maker, and a garage door.

20. A system comprising:
a first network device disposed at a site and configured to communicate with a wireless network and to perform a first operation of at least a portion of the site;
a second network device disposed at the site, mapped to the first network device, and configured to communicate with the wireless network and to perform a second operation different than the first operation;
a controller disposed at the site and in communication with the wireless network;
a passive device disposed at the site and including a unique identifier disposed thereon, the unique identifier associated with the first operation of the first network device and the second operation of the second network device different than the first operation;
the controller configured to communication with a mobile device associated with the site and including a communication chip disposed thereon, the communication chip configured to read the unique identifier when the mobile device is moved into communication with the passive device;
a mobile application disposed on the mobile device and configured to transmit the unique identified to the controller; and
the controller further configured to effectuate the first network device to perform the first operation and the second network device to perform the second operation different than the first operation in response to receipt of the unique identifier from the mobile application.

* * * * *